United States Patent
Auvinen et al.

(10) Patent No.: US 9,930,839 B2
(45) Date of Patent: Apr. 3, 2018

(54) ARRANGEMENT IN BOOM SYSTEM

(71) Applicant: PONSSE OYJ, Vieremä (FI)

(72) Inventors: Toni Auvinen, Laukkala (FI); Marko Halonen, Lapinlahti (FI)

(73) Assignee: PONSSE OYJ, Vierema (FI)

( * ) Notice: Subject to any disclaimer, the term of this patent is extended or adjusted under 35 U.S.C. 154(b) by 0 days.

(21) Appl. No.: 15/506,176

(22) PCT Filed: Aug. 25, 2015

(86) PCT No.: PCT/FI2015/050546
§ 371 (c)(1),
(2) Date: Feb. 23, 2017

(87) PCT Pub. No.: WO2016/030575
PCT Pub. Date: Mar. 3, 2016

(65) Prior Publication Data
US 2017/0238480 A1 Aug. 24, 2017

(30) Foreign Application Priority Data

Aug. 26, 2014 (FI) ..................................... 20145740

(51) Int. Cl.
*E04G 3/00* (2006.01)
*A01G 23/00* (2006.01)
*B66C 23/68* (2006.01)

(52) U.S. Cl.
CPC .............. *A01G 23/00* (2013.01); *B66C 23/68* (2013.01)

(58) Field of Classification Search
CPC .................................. B66C 23/68; A01G 23/68
See application file for complete search history.

(56) References Cited

U.S. PATENT DOCUMENTS

| 2,590,400 A * | 3/1952 | Gollnick | A01M 7/005 |
| | | | 239/166 |
| 7,344,091 B2 * | 3/2008 | Caccaviello | A01M 7/0014 |
| | | | 239/166 |

(Continued)

FOREIGN PATENT DOCUMENTS

| CA | 2357170 A1 | 3/2003 |
| EP | 2256254 A2 | 12/2010 |

(Continued)

OTHER PUBLICATIONS

International Search Report and Written Opinion of the International Searching Authority (Forms PCT/ISA/220, PCT/ISA/237 and PCT/ISA/210), dated Nov. 23, 2015, for International Application No. PCT/FI2015/050546.

*Primary Examiner* — Amy J. Sterling
(74) *Attorney, Agent, or Firm* — Birch, Stewart, Kolasch & Birch, LLP

(57) ABSTRACT

An arrangement in a boom system, specifically in a forest machine, includes at least two interlinked boom parts and at least one power transmission connected to the boom parts for moving the boom parts in relation to each other and the environment. The boom part includes an elongated body with a hollow structure and at least one set of joints intersected by turning axles for attaching the boom part to an adjacent structure, and at least one set of attachments for attaching an actuator controlling the boom system to the body, whereby at least one boom part is formed as a uniform, hollow piece made of fluid material. The cross-section of the body is made to cinch toward the midpoint of the body.

10 Claims, 5 Drawing Sheets

(56) References Cited

U.S. PATENT DOCUMENTS

2003/0234233 A1    12/2003   Lehnen et al.
2014/0112748 A1*   4/2014   Doll ........................ E02F 3/46
                                                                                              414/685

FOREIGN PATENT DOCUMENTS

| JP | 2003-336279 A | 11/2003 |
| JP | 2011-184920 A | 9/2011 |
| JP | 2011-184944 A | 9/2011 |
| WO | WO 2014/001629 A1 | 1/2014 |

* cited by examiner

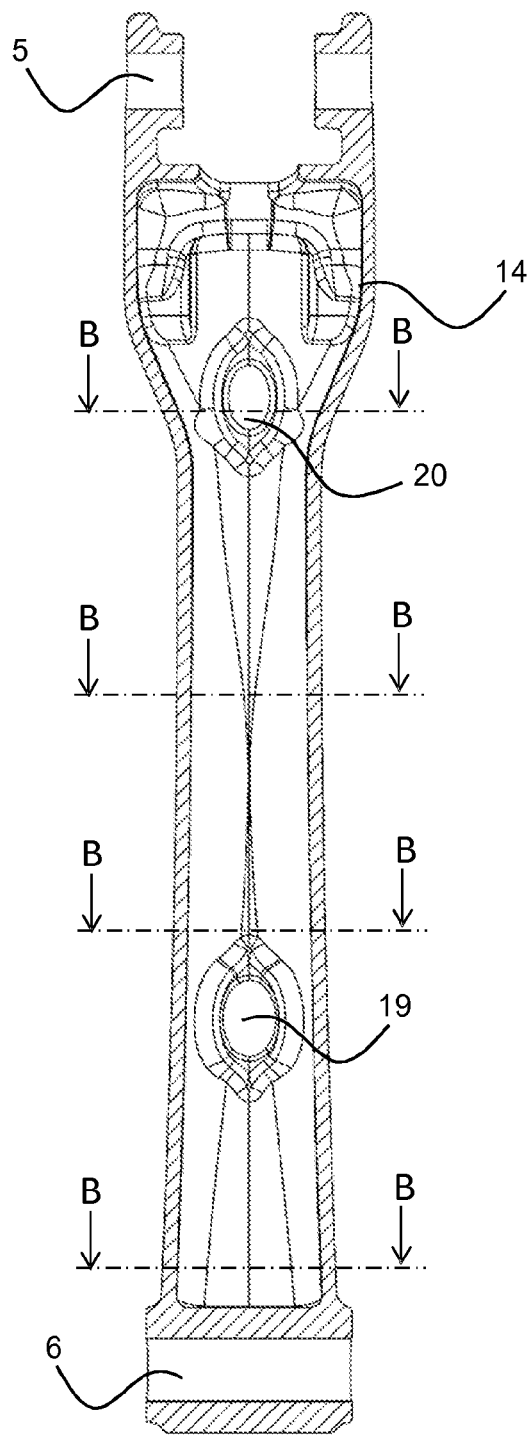
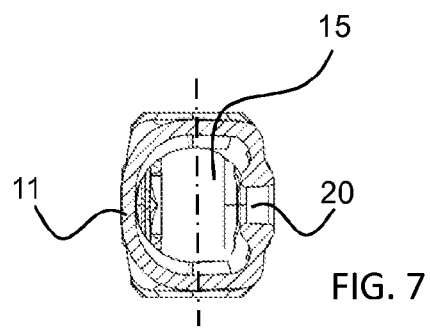
FIG. 7
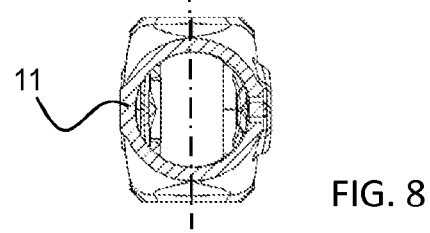
FIG. 8
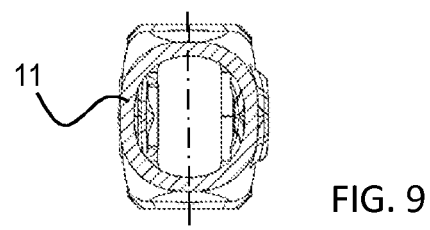
FIG. 9
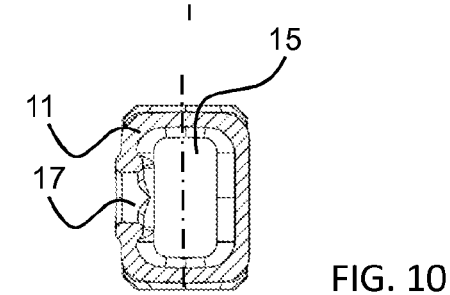
FIG. 10
FIG. 6

ARRANGEMENT IN BOOM SYSTEM

BACKGROUND OF THE INVENTION

The present invention relates to an arrangement according to claim 1 in a boom system used in a forest machine, in particular. This type of boom system comprises at least two interlinked boom parts and at least one power transmission means connected to the boom parts for moving the boom parts in relation to each other and the environment.

In a forest machine, a boom system is used for controlling various tools, such as a cutting head of a harvester or a timber grabbing bucket of a forwarder. The boom system then comprises two or more interlinked boom parts, the movement of which is controlled by actuators that are connected to lugs or corresponding fastening means attached to the boom parts for this purpose. These fastening means are arranged to transmit the desired force effect or support reaction to the structure of the boom part. In the case of a forest machine, these actuators forming the power transmission means are typically pressure medium-operated actuators producing a linear push or pull movement. Preferably, the actuators comprise one or more hydraulic cylinders or structures, such as pull or push rods, which transmit the movements of the same. The actuators can also be formed of a combination of said hydraulic cylinders and pull or push rods.

The boom parts are conventionally made of box-type structures assembled by welding from steel plates or pipe, to which the necessary fastening elements are attached mainly by welding. However, each weld joint in a boom part or made to it weakens its fatigue resistance and thus shortens the service life and reliable operation of the boom system. An attempt to solve this problem is to select stronger materials with a higher material strength for use in manufacturing the boom part. This way, the boom part is better able to endure the loads directed to it. The reverse side of such solutions is, however, that they increase the weight of the boom system, which in turn weakens the performance of the boom system.

Making welded structures is also time- and labour-consuming due to the difficult features related to the manufacturing method. For instance, deformation forces are during welding directed to the lugs required to fasten the actuator and, as a result of these, the lugs need to be machined after welding to achieve a dimensionally accurate end-result. In some cases, this problem has been solved by making the lugs from cast pieces fastened to the boom part by a bolted joint. However, problems related to these include the loosening of the bolts and the need for maintenance of the structure during use, for instance.

BRIEF DESCRIPTION OF THE INVENTION

An object of the present invention is thus to develop an apparatus to provide a completely novel solution to the above-mentioned problems caused by prior-art drawbacks.

This object is achieved in such a manner that the arrangement in a boom system is, in accordance with the present invention, provided with the characteristic features defined in the claims. To be more precise, this arrangement according to the invention is mainly characterised in that a boom part comprises an elongated body with a hollow structure, which has at least one joint means intersected by turning axles for attaching the boom part to an adjacent structure, and at least one set of connection means for connecting an actuator controlling the boom system to the body. At least one boom part is then formed as a uniform hollow piece made of fluid material.

Preferred embodiments of the invention are disclosed in the dependent claims.

Within the scope of the present invention, the term "boom system" refers to a device that is built up of boom parts and forms a feeder of a timber handling machine, a crane, a manipulator, or some other lifting device of this type, for example.

The term "fluid material" refers herein to both molten materials and powdery materials.

The invention provides considerable advantages. Therefore, by using simple solutions, the present invention provides a significantly stronger and more simplified boom system structure than before. The present arrangement has good dimensional accuracy that is perfect to speed up the assembly of the boom system, thus, making it more economical to manufacture and providing significant benefits in terms of manufacturing.

The present solution provides optimum material positioning where the greatest strength is required in the arrangement. When making a boom system of a steel plate or pipe, it is not possible to alter the wall thickness of a boom part in only some of the structure. In the prior-art solutions, the wall thickness is determined by the weakest point, i.e. usually the weld joint, of the plate or pipe structure. The weld joint is where the material properties are the weakest due to the heat input in the weld. Therefore, an unnecessarily large wall thickness needs to be kept in the rest of the structure. In a pipe structure, the cross-section also needs to be dimensioned according to the most stressed point and direction, whereby an unnecessarily large cross-section remains in the other locations. When utilising a structure made of fluid material, the shape of the cross-section of the boom part can be optimised according to load, structural weight and space utilization, for instance.

This way, an even lighter boom system structure than before is achieved as a whole. This way, it is possible to improve both the performance of the boom system and the stability and energy-efficiency of the machine driving it as the centre of mass is lower and the total weight smaller.

A body according to the present arrangement can also be formed with a mid-section that is thinner than the rest of the body. This type of boom part obstructs the visibility of the forest machine operator to the work site as little as possible.

Other advantages provided by the invention are disclosed in the following more detailed description of the specific embodiments of the invention.

BRIEF DESCRIPTION OF THE FIGURES

In the following, some preferred embodiments of the invention will be explained in more detail with reference to the accompanying drawing, in which FIG. 6 shows another vertical section of the arrangement at an angle of 90 degrees from the section of FIG. 5, FIG. 7 shows a horizontal section at B-B of FIG. 6, FIG. 8 shows a horizontal section at C-C of FIG. 6, FIG. 9 shows a horizontal section at D-D of FIG. 6, FIG. 10 shows a horizontal section at E-E of FIG. 6.

DETAILED DESCRIPTION OF PREFERRED EMBODIMENTS

The present figures do not show the arrangement in a boom system in scale but the figures are schematic and illustrate the general structure and operation of the preferred embodiments. The structural parts shown by reference numbers in the attached figures then correspond to the structural parts marked by reference numbers in this specification.

Figure 1:
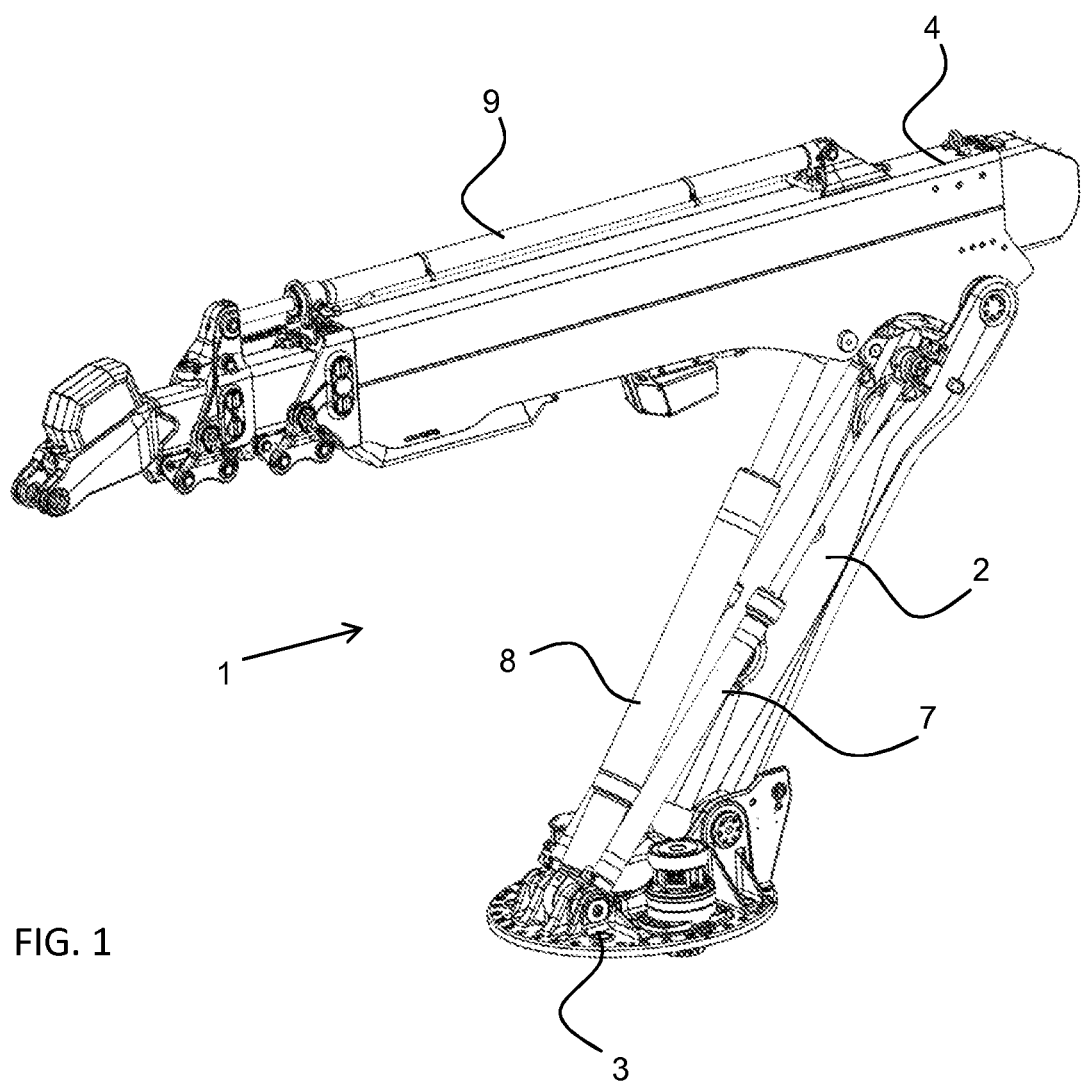
FIG. 1 shows an arrangement of the invention in a boom system of a crane with a sliding boom.

FIG. 1 shows by way of example a crane with a sliding boom, in which the present arrangement is utilised. This type of boom system 1 formed by the crane comprises at least two boom parts arranged turnably to each other, of which the first boom part 2, i.e. main boom, is conventionally connected to a forest machine by using a turning substructure 3, turning device, or crane table, for instance. In this case, the present arrangement forms the main boom. The second boom part 4 of the figure, i.e. the folding boom with its telescopic extension, is conventionally arranged directly or indirectly to support a tool known per se, such as a harvester cutting head or timber grabbing bucket of a forwarder. These conventional tools are not described in more detail herein.

Figures 2, 3:
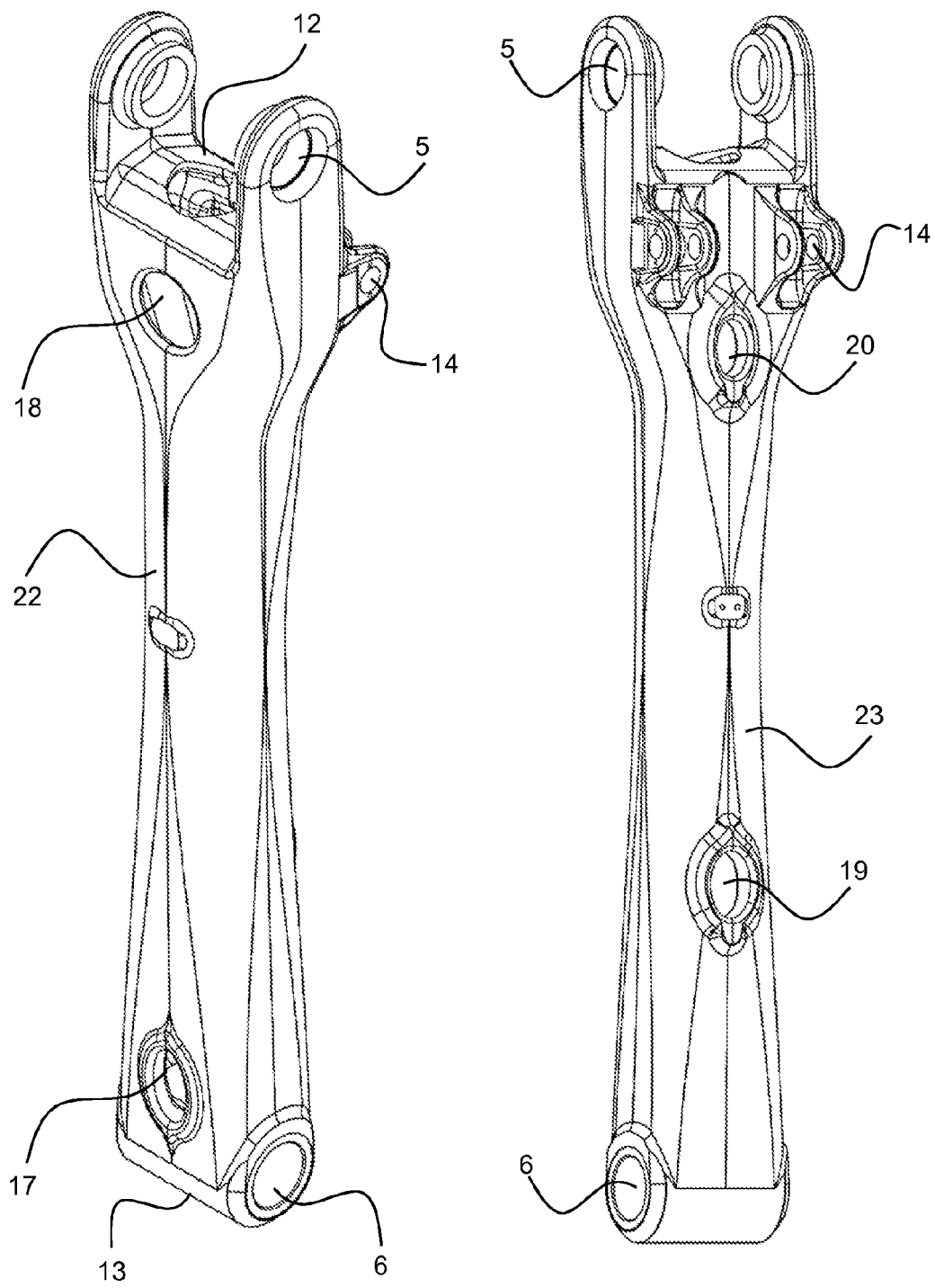
FIG. 2 is an axonometric view of the arrangement detached from the boom system of FIG. 1 as seen from the back.
FIG. 3 is an axonometric view of the arrangement detached from the boom system of FIG. 1 as seen from the front.

The boom parts 2 and 4 of the boom system 1 comprise elongated means with joint means 5 and 6 as shown in FIG. 2, for example, for connecting the boom parts in an articulated manner known per se to the adjacent structures. As shown in FIG. 1, power transmission means 7, 8, and 9 are connected to the boom parts to utilize in moving the boom parts in relation to each other and the environment for the purpose of turning the boom system and extending it on the horizontal and vertical planes. In this context, power transmission means comprising a hydraulic actuator connected to the boom parts are shown by way of example. However, it should be remembered that moving the boom part can also be implemented by other means. These include various lever mechanisms, push and pull rods and bars or even wires.

Figures 4, 5:
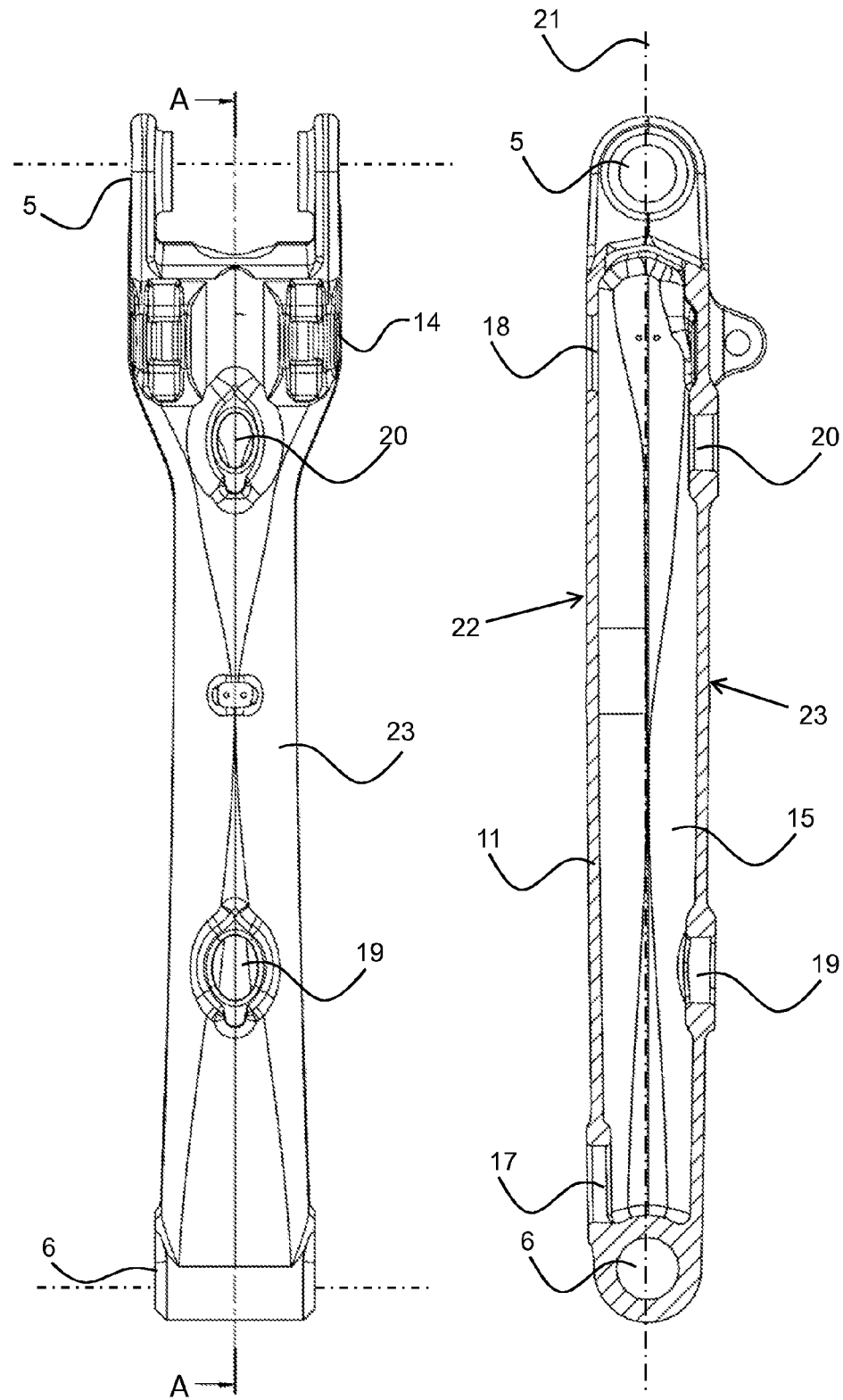
FIG. 4 is a view of the arrangement detached from the boom system of FIG. 1 as seen from the front.
FIG. 5 shows a vertical section of said arrangement at point A-A of FIG. 4.

In the present embodiment according to FIGS. 2 to 10, the main boom 2 forming the arrangement comprises an elongated body 11 with a hollow structure, see FIG. 5. The first end 12 of this body has first joint means 5, and the second end 13 of the body according to this embodiment has second joint means 6, with which the arrangement can be attached as part of the boom system 1. The body further has specific attachment means 14, with which one or more actuators 7, 8, or 9 controlling the boom system can be attached to the body. The arrangement is made of iron, steel, or some other fluid material with sufficient strength. Thus, to minimize the weight, the body is made into a hollow, uniform piece with an envelope surface 16 surrounding the cavity 15 in the body 11. This way, a dimensionally accurate boom part is provided, which has the necessary joint means, which only require machining, at opposite ends and at least one attachment means between them for the actuator. After manufacture, the boom part is finish-ground and surface-treated and the necessary areas are finished by machining.

Thus, the boom part can be made by laser-sintering by utilising so-called three-dimensional printing. The boom part modelled by software suitable for the purpose can thus be made in a dimensionally accurate manner such that it has the desired cross-sectional profiles and wall thicknesses.

When making the boom part by casting, the casting may be made as light as possible by making it hollow by using a sand core arranged in the mould during casting. This has not been specifically shown in the present figures. The core is supported during casting against the opposite walls of the boom part mould, preferably at least at two opposite locations. This support prevents the bending of the core inside and its movement during casting, which would otherwise be caused by the lift from the molten metal. For this purpose, specific casting gates 17, 18, 19, and 20 are made into the arrangement for implementing the support. In the embodiment according to the figures, two pairs of said casting gates are made into the boom part to be located on opposite sides of the sectional plane 21 halving the boom part. This sectional plane of the body according to FIG. 5 is thus defined by parallel turning axles intersecting the joint means at opposite ends of the body and produced in the same casting operation. In embodiments with only one turning axle, the sectional plane is defined by this at least one turning axle together with the centre axle of the body intersecting it.

Naturally, the arrangement can also be cast in such a manner that the core is supported through one casting gate on opposite sides of the sectional plane of the body, but a more reliable result is probably obtained by using one casting gate on the first side of the sectional plane and two on the other side thereof.

These casting gates 17 to 20 are a compromise to achieve strength and sufficient support for the cores. They are designed to be as functional as possible so that no harmful stresses are directed to them and the main boom 2 during the load directed to the boom system 1 during use. Thus, a casting gate is preferably substantially oval in shape. It is preferably also equipped with a specific edge reinforcement to improve the strength of the envelope of the arrangement and reduce the stresses directed to the arrangement. Edge reinforcements of this type are shown in FIGS. 7 and 10, for example.

The above-mentioned sectional plane also defines a front side 22 and back side 23 on the opposite sides of the body, in which case the attachment means 14 formed on the body are on the front side of the arrangement.

Figure 11:
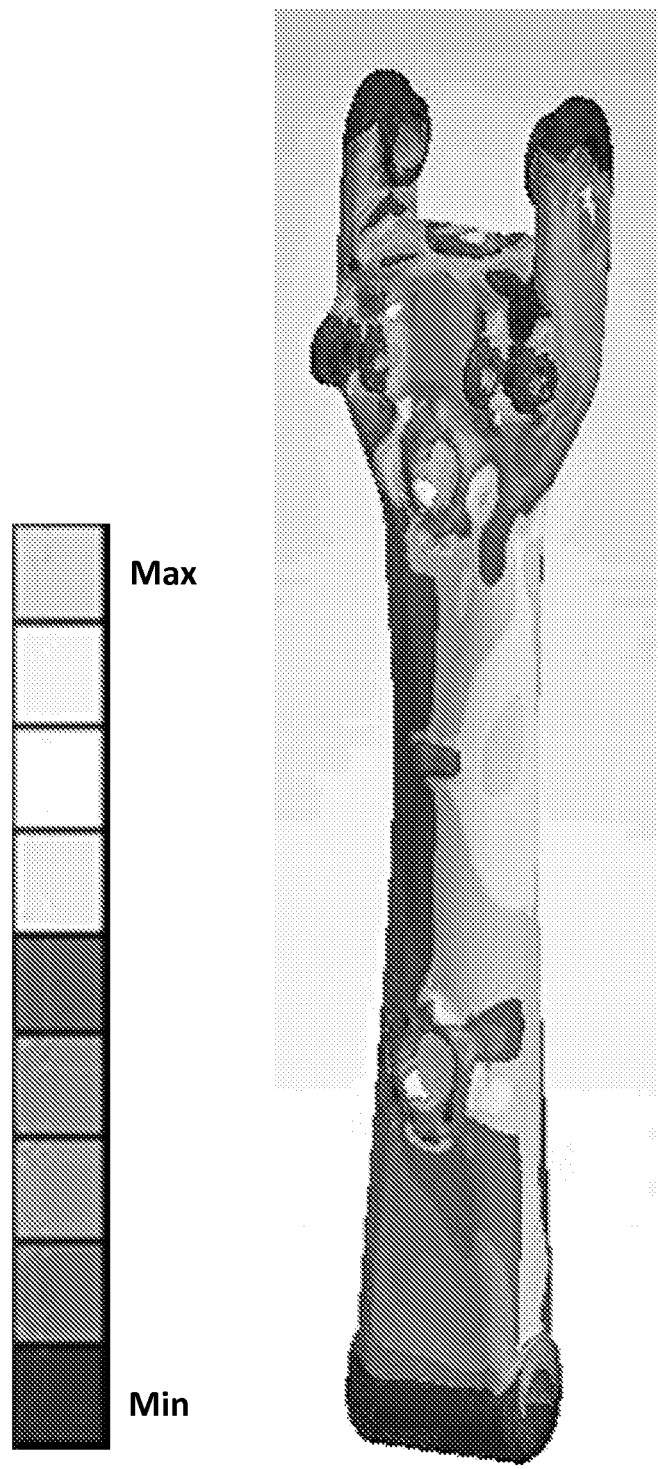
FIG. 11 is a stress diagram from the design phase, i.e. a view produced by a FEM analysis.

By making the boom part of a fluid material, it is possible to increase the moment of gyration of the body 11 preferably by shaping the cross-section of the body in such a manner that in the direction perpendicular to the longitudinal axis of the body and converging with the sectional plane 21 the cross-section is mainly larger than the sectional plane in the perpendicular direction. In addition, in a boom part of this type, it is possible to optimize the positioning of material in the arrangement according to the load, weight of structure and space utilization so as to provide the best strength properties at each time. Design software known per se, such as the FEM analysis that produces stress graphs as shown in FIG. 11, can be utilized in this optimization. Thus, FIGS. 7 to 10 show how both the wall thickness and wall shape of the boom part body vary at different points of the body. The wall thickness may vary from 10 to 100 mm, and is preferably 18 to 25 mm when made by casting, for example. The cross-section of the body can also be made to cinch toward the midpoint of the body or, reversely, the cross-section of the body can be made to expand in the direction of the turning axle and from the midpoint of the body toward the ends.

Another embodiment can also be formed of the boom part, in which, instead of two opposite joint means, the body has a joint means has at one end thereof and, at the other end, necessary machined surfaces, with which the boom part can be mounted directly on the turning device. This way, the boom part is rotatable on its site of use around its substantially vertical longitudinal axis. In this embodiment, the boom part is preferably part of a timber feeder and forms specifically the first boom part, i.e. the column or pillar of a feeder, as seen from the turning device of a forwarder boom system. Through the turning device, this type of boom part can be turned by means of gear transmission, for instance. The required gears can preferably be made and machined directly as part of the boom part that is preferably made by casting.

As in the first embodiment, this type of arrangement in a boom system also comprises at least two interlinked boom parts and at least one power transmission means connected to the boom parts for moving the boom parts in relation to each other and the environment. The boom part on the base side of the boom system then comprises an elongated body with a hollow structure and made of a fluid material, which has a joint means intersected by the turning axle for the purpose of attaching the boom part to the adjacent structure. At its opposite end, the body has specific machined surfaces, with which the boom part can be mounted on a turning device, for example. The boom part also has at least one set of attachment means made in the same manufacturing process for the purpose of attaching the actuator controlling the boom system to the body.

As in the first embodiment described above, this boom part, too, comprises a sectional plane defined by the turning axle and the centre axis of the body intersecting it in such a manner that at least one pair of casting gates are formed on the body on the opposite sides of the sectional plane during casting. The casting gates correspond to those described above in operation and structure.

It is to be understood that the above description and the related figures are only intended to illustrate the present solution. The solution is thus not restricted to the embodiment described above or defined in the claims, but it will be obvious to a person skilled in the art that different variations and modifications are possible within the scope of the idea defined in the accompanying claims.

The invention claimed is:

1. An arrangement in a boom system, wherein said boom system is used in a forest machine, the boom system comprising:
   at least two interlinked boom parts; and
   at least one power transmission connected to the boom parts for moving the boom parts in relation to each other and the environment,
   the boom parts comprising:
      an elongated body with a hollow structure;
      at least one set of joints intersected by turning axles for the purpose of attaching the boom part to an adjacent structure; and
      at least one set of attachments for attaching the power transmission controlling the boom system to the body,
   wherein at least one of said boom parts is formed as a uniform, hollow piece made of fluid material, and
   wherein the cross-section of the body is made to cinch toward the midpoint of the body.

2. The arrangement as claimed in claim 1, wherein the boom part is formed of a powdery material by sintering.

3. The arrangement as claimed in claim 1, wherein the boom part is formed of a molten material by casting, whereby
   at least one turning axle and the centre axis of the body intersecting it define a sectional plane in such a manner that at least one pair of casting gates is formed on the body on opposite sides of the sectional plane.

4. The arrangement as claimed in claim 3, wherein on one side of the sectional plane of the body, there is one casting gate, and on the other side of the sectional plane, there are two casting gates.

5. The arrangement as claimed in claim 3, wherein at least two pairs of casting gates are formed on the body on opposite sides of the sectional plane.

6. The arrangement as claimed in claim 3, wherein the arrangement comprises a front side and back side on opposite sides of the sectional plane, the attachments being on the front side of the arrangement.

7. The arrangement as claimed in claim 3, wherein the body has a cross-section that in the direction perpendicular to the longitudinal axis of the body and converging with the sectional plane is larger than in the direction perpendicular to the sectional plane.

8. The arrangement as claimed in claim 3, wherein one or more casting gates comprise an edge reinforcement.

9. The arrangement as claimed in claim 3, wherein the casting gate is oval in shape.

10. The arrangement as claimed in claim 1, wherein the cross-section of the body expands in the direction of the turning axle and from the midpoint of the body to the ends.

* * * * *